United States Patent

[11] 3,592,211

| [72] | Inventor | Cyril Spalding<br>Welwyn Garden City, England |
|---|---|---|
| [21] | Appl. No. | 779,280 |
| [22] | Filed | Nov. 26, 1968 |
| [45] | Patented | July 13, 1971 |
| [73] | Assignee | Hawker Siddeley Dynamics Limited<br>Hatfield, England |
| [32] | Priority | Nov. 30, 1967 |
| [33] | | Great Britain |
| [31] | | 54676/67 |

[54] PRESSURE-REGULATING VALVE
3 Claims, 4 Drawing Figs.

[52] U.S. Cl. .................................................... 137/83,
                    137/85, 137/625.64, 137/625.61
[51] Int. Cl. ......................................................... F15b 5/00,
                    F15c 3/02
[50] Field of Search .......................................... 137/85, 86,
                    83, 625.61, 625.64

[56] References Cited
UNITED STATES PATENTS

| 2,790,427 | 4/1957 | Carson | 137/625.61 |
| 3,258,025 | 6/1966 | Howland | 137/85 |
| 3,326,228 | 6/1967 | Phillips | 137/86 |
| 2,931,389 | 4/1960 | Moog | 137/625.62 |
| 3,454,026 | 7/1969 | Orme | 137/625.64 X |

FOREIGN PATENTS

| 1,093,210 | 11/1960 | Germany | 137/625.64 |

*Primary Examiner*—Alan Cohan
*Attorney*—Dowell & Dowell

ABSTRACT: A pressure-regulating valve is provided, especially for an antiskid braking system, which has two fluidic stages of amplification, the first being a jet pipe regulator device and the second a spool valve in a cylinder. The input signal to the second stage is applied to one end of the spool valve and proportions of the supply and regulated output pressures are applied to the opposite end.

PRESSURE-REGULATING VALVE

This invention relates to pressure-regulating valves, and especially valves for progessive regulation of a fluid pressure in accordance with progressive variations of a small electrical input signal.

It is an object of the invention to provide a valve design such that the regulated output can readily be made to vary from 0 to 100 percent of the fluid supply pressure, preferably but not necessarily linearly, in response to the full available range of variation of the input signal.

According to the present invention, a pressure-regulating valve has two fluidic stages the second of which amplifies the regulated output of the first, and in the second stage the variable input signal thereto, constituted by the first stage output, is opposed by a proportion of the regulated second stage output applied as negative feedback and also by a proportion of the main supply pressure upon which the second stage operates. In a convenient practical form, the second stage may comprise a spool valve moving axially in a cylinder to control communication of the regulated output line alternatively with a supply pressure line and a return line, and the first stage output signal is applied as a pressure on one end of the valve spool while the negative feedback and the chosen proportion of the supply pressure are applied to the opposite end of the spool by means of pistons or plungers, of smaller diameter than the spool, bearing on that opposite end.

In the preferred form also, the first fluidic stage is constituted by a relay of the jet pipe regulator type, in which the pressure in a receiver port is determined by the position of a jet nozzle movable relatively thereto. Such a relay requires only a light force and a small input movement amplitude for its operation and so can conveniently be coupled on the output of a torque motor receiving the small electrical input signal.

One electrohydraulic pressure-regulating valve system in accordance with the invention will now be described, by way of example, with reference to the accompanying drawings, in which.

The specific embodiment of the invention to be described in a three-way electrohydraulic pressure regulating valve designed to be part of an antiskid aircraft braking system. The valve is required to have three hydraulic connections, viz; pressure inlet, controlled pressure outlet and return. The input signal is a small DC electrical current with a power ranging from zero to approximately one tenth of watt at maximum. The regulated pressure is required to be linearly reduced from full inlet pressure to zero with increasing electrical signal, an ideal characteristic being shown in FIG. 1. It should be noted that the valve must be of a variable-gain type so that the regulated pressure expressed as a percentage of the supply pressure varies inversely with the magnitude of the electrical input signal; that is 100 percent reduction occurs at 100 percent signal regardless of inlet pressure.

Figure 2:
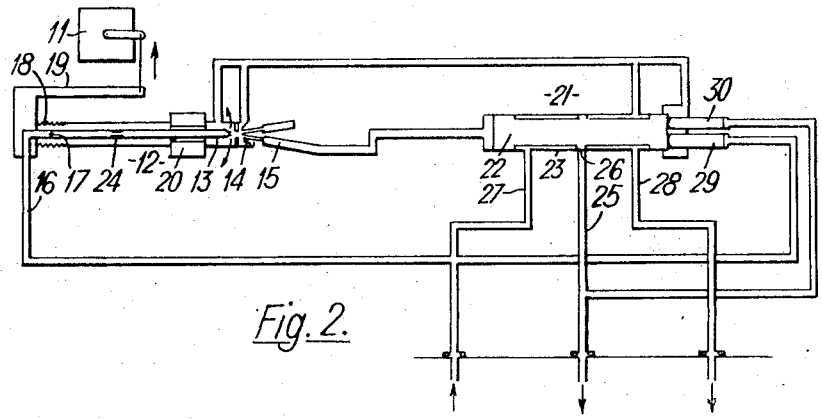
FIG. 2 shows the valve system diagrammatically.

Referring to FIG. 2, which shows the arrangement of the unit diagrammatically, a torque motor 11 is employed to produce a mechanical movement proportional to the electrical input signal. Because of the very low level of power available from the input the first hydraulic stage 12 comprises a jet pipe or nozzle 13 moving across a receiver port 14. The pressure recovered in the conduit 15 leading from the receiver port 14 is a percentage of the supply pressure applied to the jet via the line 16 and a restriction 24, and this percentage varies as the jet is moved about a pivot 17 with respect to the receiver port.

With use of a metal bellows 18 at the pivot 17, the jet pipe 13 can be moved by an external mechanical input. The bellows acts as a seal between the hydraulic fluid and atmosphere and it allows motion from the torque motor 11 to be transmitted to the jet pipe by means of a jet valve input arm 19. The jet valve is particularly suited to this application because it requires very small movements and very small forces to control it. The effects of vibration and '$g$' loads are minimized by an oil film damper 20 attached to the jet nozzle, by the magnetic 'stiffness' of the torque motor and by careful mass balancing.

Figure 3:
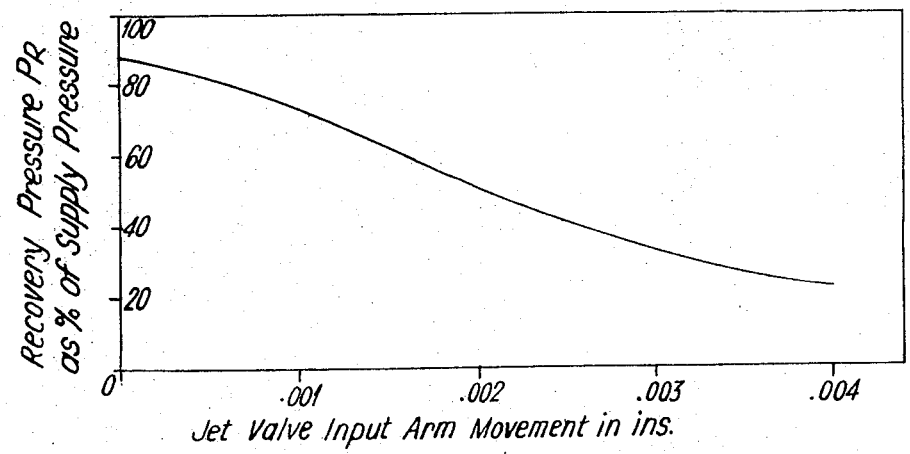
FIGS. 3 and 4 are expected operating characteristics, graphically presented.

A typical pressure recovery characteristic for the jet valve is shown in FIG. 3, which is a graph of recovery pressure $P_R$, expressed as a percentage of supply pressure, plotted against jet valve input arm movement. The linear portion of this curve can be selected as the input to a second stage spool-type fluid amplifier 21 provided:

a. the output is compensated so that the minimum pressure input results in zero output, i.e. a fixed percentage of the input pressure is to be subtracted from the output; and b. the range of the input signal is amplified to the equivalent of a range from 0 to 100 percent of the supply pressure.

The second stage amplifier 21 comprises a spool 22 sliding in a cylinder 23 and controlling the admission and exhaust of pressure fluid to and from an output line 25 by means of a land 26 on the spool which has full supply pressure $P_S$ applied on one side via a line 27 while the other side communicates with a return line 28. The recovery pressure $P_R$ of the jet valve is applied by the conduit 15 to one end of the spool 22.

Compensation as defined at (a) above is achieved by applying the input pressure $P_S$ to a compensating piston 29 whose area is the required percentage of the input end area of the spool 22, this compensating piston acting on the opposite end of the spool to the pressure $P_R$ so as to subtract its effort from the input force.

The amplification factor is determined by applying the output pressure $P_o$ in the line 25 to a feedback piston 30 whose area is a chosen percentage of the input end area of the spool, this feedback piston acting on the same end of the spool as the compensating piston 29 to apply a pressure feedback signal.

Figure 1:
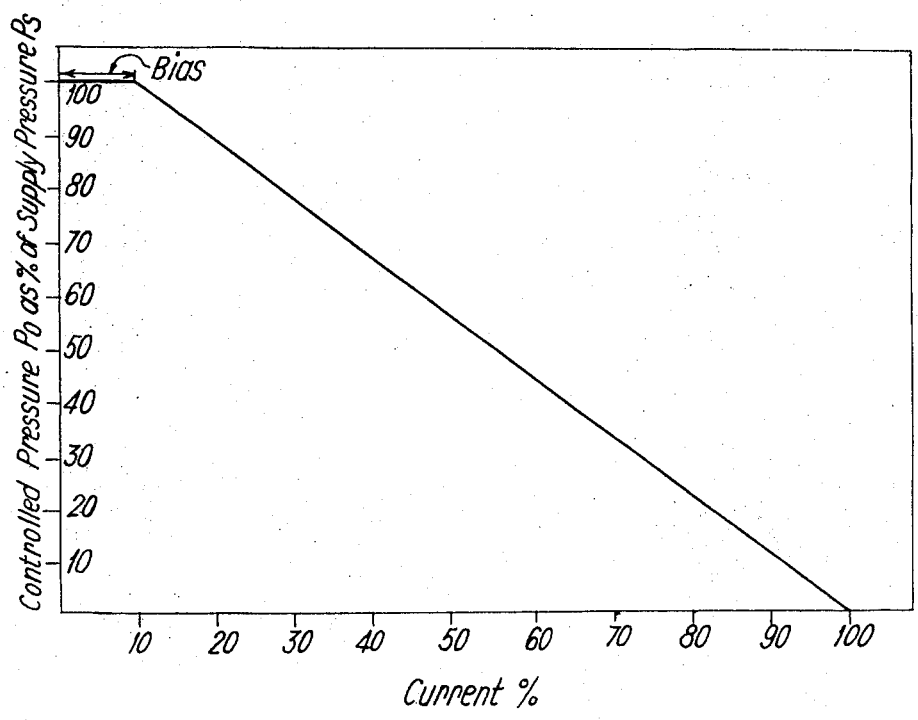
FIG. 1 illustrates graphically an ideal characteristic of the system.

If the amplification is slightly greater than that necessary to produce an output rising linearly to be equal to 100 percent of the supply pressure, a short plateau occurs at the beginning of the overall pressure characteristic as shown in FIG. 1 since it is obviously impossible for the output pressure to exceed the full input pressure.

Figure 4:
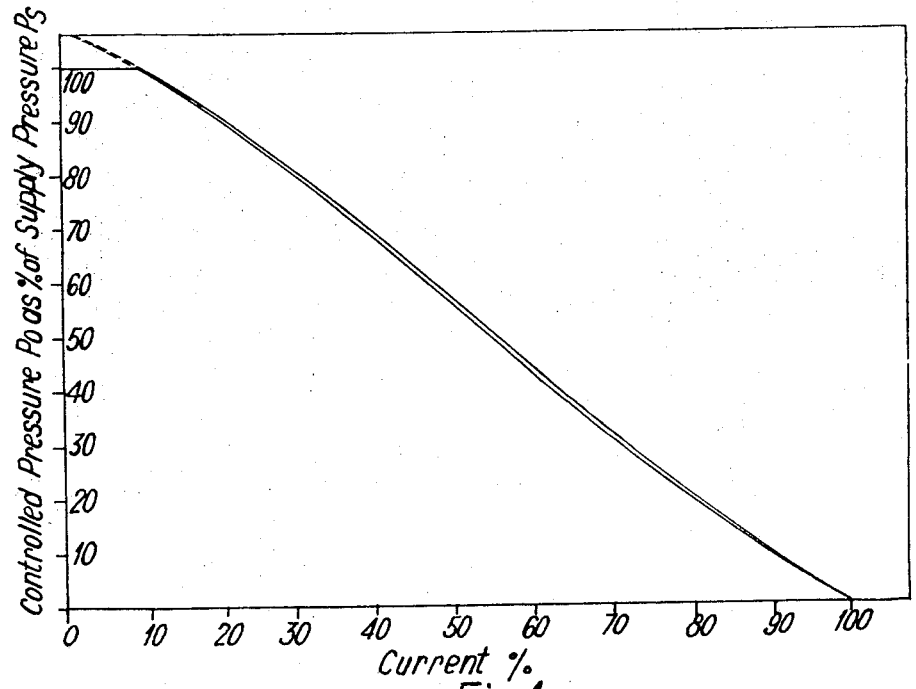

The linearity of the output characteristic of the complete unit (FIG. 1) depends mainly on the use of linear portions of the torque motor characteristic and the jet valve recovery pressure characteristic (FIG. 3), and on the design of the linkage between these two devices. Taking these factors into consideration an overall performance characteristic for the unit may be expected to be as shown in FIG. 4.

Whereas in the particular application of the invention described the pressure-regulating valve is referred to as employed in a braking system, it could be used in other appropriate electrohydraulic applications. Also, while in the braking system a linear characteristic is required, such an arrangement could have a nonlinear performance without department from the scope of the invention.

I claim:

1. A pressure-regulating valve, including in combination: a first regulating stage comprising first stage fluid inlet means receiving fluid pressure from a first stage pressure fluid supply conduit, first stage fluid pressure output means having transmitted thereto a variable percentage of the fluid pressure applied to said first stage fluid inlet means, first stage pressure-regulating means operable in response to a first stage control signal to vary said percentage of the first stage inlet fluid pressure that is transmitted to said first stage fluid pressure output means; a controlling input device applying said first stage control signal to said first stage pressure-regulating means; a second regulating stage comprising second stage fluid inlet means receiving fluid pressure from a second stage pressure fluid supply conduit, a fluid exhaust line, second stage fluid pressure output means having transmitted thereto a variable percentage of the fluid pressure applied to said second stage fluid inlet means, second stage regulating means comprising a ported cylinder and a valve spool moving axially therein in response to a plurality of second stage fluid pressure control signals to control communication of said second stage fluid output means alternatively with said second stage fluid inlet means and said fluid exhaust line and thereby vary said percentage of the second stage inlet fluid pressure that is transmitted to said second stage fluid pressure output means; interstage fluid conduit means applying the output pressure of said first stage fluid pressure output means to one end of said valve spool to constitute a first one of said plurality of second stage fluid pressure control signals, two pistons of smaller diameter than said valve spool which bear on the opposite end of said spool; feedback means applying the output pressure of said second stage fluid pressure output means as negative feedback to one of said two pistons to constitute a second one of said plurality of second stage fluid pressure control signals acting in opposition to said first one of said second stage control signals; and further conduit means applying the input pressure of said second stage fluid inlet means to the other of said two pistons to constitute a third one of said plurality of second stage fluid pressure control signals acting in opposition to said first one of said second stage control signals.

2. A valve according to claim 1, wherein said first regulating stage is constituted by a relay of the jet pipe regulator type, in which said first stage fluid pressure output means comprises a receiver port and said first stage regulating means comprises a jet nozzle movable relatively to said receiver port in response to said first stage control signal.

3. A valve according to claim 2, wherein said controlling input device is a torque motor providing as said first stage control signal a small mechanical movement proportional to an electrical input signal, this mechanical movement being applied to said jet nozzle of the jet pipe regulator.